(12) United States Patent
Kirker et al.

(10) Patent No.: US 7,320,750 B2
(45) Date of Patent: *Jan. 22, 2008

(54) CENTRIFUGE WITH CONTROLLED DISCHARGE OF DENSE MATERIAL

(75) Inventors: Curtis Kirker, Kamuela, HI (US); Berkeley F. Fuller, Kamuela, HI (US)

(73) Assignee: Phase Inc., Kamuela, HI (US)

( * ) Notice: Subject to any disclaimer, the term of this patent is extended or adjusted under 35 U.S.C. 154(b) by 304 days.

This patent is subject to a terminal disclaimer.

(21) Appl. No.: 10/798,124

(22) Filed: Mar. 11, 2004

(65) Prior Publication Data

US 2004/0178138 A1 Sep. 16, 2004

Related U.S. Application Data

(60) Provisional application No. 60/454,448, filed on Mar. 11, 2003.

(51) Int. Cl.
*B04B 1/04* (2006.01)
*B04B 1/14* (2006.01)
*B01D 21/26* (2006.01)

(52) U.S. Cl. ............... 210/90; 210/360.1; 210/371; 210/378; 494/2; 494/36; 494/44; 494/56; 494/60

(58) Field of Classification Search .......... 210/741, 210/787, 90, 97, 143, 360.1, 378, 380.1, 210/371; 494/1, 2, 3, 4, 36, 44, 56, 60
See application file for complete search history.

(56) References Cited

U.S. PATENT DOCUMENTS 2,028,168 A 1/1936 Roberts
2,538,529 A 1/1951 Komline
2,664,905 A 1/1954 Harstick ............... 494/4
2,688,437 A 9/1954 Monnet (Continued)

FOREIGN PATENT DOCUMENTS

DE 246696 3/1910

(Continued)

OTHER PUBLICATIONS

International Search Report PCT/US 99/15891, 6 pages, Jul. 12, 1999.

(Continued)

*Primary Examiner*—David A Reifsnyder
(74) *Attorney, Agent, or Firm*—Baker Botts L.L.P.

(57) ABSTRACT

A centrifuge with controlled discharge of dense materials disclosed. A centrifuge includes a fluid separation wall placed within a sleeve to form a containment zone therebetween. The fluid separation wall aligns and rotates parallel to an axis of rotation. A receptacle forming a part of the fluid separation wall includes a void area. An opening extending through the fluid separation wall from the void area to the outer surface of the receptacle transports the more dense material to the containment zone. A valve ring forming a part of the fluid separation wall includes a valve orifice. The valve ring aligned perpendicular to the axis of rotation and slides along the fluid separation wall to move between open and closed positions. The valve orifice aligns with the opening such that the more dense material exits the fluid separation wall and moves into the containment zone.

28 Claims, 6 Drawing Sheets

U.S. PATENT DOCUMENTS

| | | | |
|---|---|---|---|
| 3,327,401 A | 6/1967 | Stamos et al. | |
| 3,622,003 A | 11/1971 | Czech et al. | 210/108 |
| 3,693,415 A | 9/1972 | Whittington | 73/69.9 |
| 3,937,317 A | 2/1976 | Fleury, Jr. | |
| 3,940,056 A | 2/1976 | Schmidt | |
| 3,960,318 A | 6/1976 | Dahlberg | |
| 3,961,746 A | 6/1976 | Werner | |
| 3,967,778 A | 7/1976 | Hunwick | |
| 3,977,515 A | 8/1976 | Lewoczko | |
| 4,005,817 A | 2/1977 | Charlton | |
| 4,015,773 A | 4/1977 | Thylefors | |
| 4,027,820 A | 6/1977 | Kulker | |
| 4,067,494 A | 1/1978 | Willus | |
| 4,070,290 A | 1/1978 | Crosby | |
| 4,071,376 A | 1/1978 | McNeer | 134/1 |
| 4,083,488 A | 4/1978 | Gunnewig | |
| 4,103,822 A | 8/1978 | Stroucken | |
| 4,149,668 A | 4/1979 | Zurbruggen | |
| 4,164,317 A | 8/1979 | Nelson | |
| 4,190,537 A | 2/1980 | Tondreau et al. | 210/98 |
| 4,251,023 A | 2/1981 | Hohne | |
| 4,253,962 A | 3/1981 | Thompson | 210/414 |
| 4,288,029 A | 9/1981 | Epper et al. | |
| 4,298,162 A | 11/1981 | Hohne | |
| 4,311,270 A | 1/1982 | Hovstadius | |
| 4,331,270 A | 5/1982 | Humlong | |
| 4,343,431 A | 8/1982 | Wehling | |
| 4,375,870 A | 3/1983 | Bodelson | 494/40 |
| 4,379,976 A | 4/1983 | Pitchford | |
| 4,381,849 A | 5/1983 | Conant | 494/43 |
| 4,410,319 A | 10/1983 | Zettier et al. | 494/29 |
| 4,430,221 A | 2/1984 | Spiewok | 210/380.1 |
| 4,490,133 A | 12/1984 | Zettier | 494/27 |
| 4,504,262 A | 3/1985 | Forsberg | 494/53 |
| 4,505,697 A | 3/1985 | Lee et al. | 494/35 |
| 4,514,183 A | 4/1985 | Kohlstette | 494/27 |
| 4,519,496 A | 5/1985 | Ludvegsen | 198/676 |
| 4,543,083 A | 9/1985 | Bounds | 494/4 |
| 4,569,761 A | 2/1986 | Spiewok et al. | 210/380.1 |
| 4,581,896 A | 4/1986 | Andresen | 60/487 |
| 4,629,564 A | 12/1986 | Pinato | |
| 4,643,709 A | 2/1987 | Lee et al. | 494/37 |
| 4,645,485 A | 2/1987 | Neimerg | 494/27 |
| 4,698,053 A | 10/1987 | Stroucken | 494/70 |
| 4,701,158 A | 10/1987 | Inge et al. | 494/74 |
| 4,707,259 A | 11/1987 | Doucet | 210/351 |
| 4,710,159 A | 12/1987 | Gullers | 494/27 |
| 4,717,376 A | 1/1988 | Bruning et al. | 494/40 |
| 4,721,505 A | 1/1988 | Inge et al. | 494/74 |
| 4,729,759 A | 3/1988 | Krook | 494/4 |
| 4,762,615 A | 8/1988 | Drori | 210/333.01 |
| 4,784,634 A | 11/1988 | Schiele | 494/56 |
| 4,793,932 A | 12/1988 | Ford et al. | 210/636 |
| 4,813,923 A | 3/1989 | Johansson | 494/48 |
| 4,820,256 A | 4/1989 | Nordstrom | 494/3 |
| 4,840,612 A | 6/1989 | Pallmar | 494/2 |
| 4,861,329 A | 8/1989 | Borgstrom et al. | 494/67 |
| 4,872,988 A | 10/1989 | Culkin | 210/636 |
| 4,876,006 A | 10/1989 | Ohkubo et al. | 210/321.69 |
| 4,925,442 A | 5/1990 | Bodelson | 494/40 |
| 4,952,317 A | 8/1990 | Culkin | 210/636 |
| 4,978,331 A | 12/1990 | Luchetta | 494/37 |
| 4,995,977 A | 2/1991 | Hilgendorff et al. | 210/321.69 |
| 5,004,542 A | 4/1991 | Lyons et al. | 210/356 |
| 5,034,124 A | 7/1991 | Kopf | 210/231 |
| 5,045,049 A | 9/1991 | Lantz | 494/70 |
| 5,052,996 A | 10/1991 | Lantz | 494/68 |
| 5,100,556 A | 3/1992 | Nichols | 210/651 |
| 5,108,604 A | 4/1992 | Robbins | 210/321.74 |
| 5,143,613 A | 9/1992 | Bitter et al. | 210/321.8 |
| 5,182,019 A | 1/1993 | Cote et al. | 210/321.8 |
| 5,197,939 A | 3/1993 | Cederkvist | 494/53 |
| 5,202,024 A | 4/1993 | Andersson et al. | |
| 5,225,080 A | 7/1993 | Karbachsch et al. | 210/321.75 |
| 5,234,605 A | 8/1993 | Reipur et al. | 210/741 |
| 5,244,584 A | 9/1993 | Schlieperskoetter | 210/787 |
| 5,275,725 A | 1/1994 | Ishii et al. | 210/321.67 |
| 5,304,312 A | 4/1994 | Forster et al. | 210/808 |
| 5,338,284 A | 8/1994 | Knelson | 494/28 |
| 5,362,292 A | 11/1994 | Borgstrom et al. | 494/74 |
| 5,366,625 A | 11/1994 | Pederson et al. | 210/321.78 |
| 5,374,234 A | 12/1994 | Madsen | 494/53 |
| 5,380,434 A | 1/1995 | Paschedag | |
| 5,397,471 A | 3/1995 | Rodebush | |
| 5,429,581 A | 7/1995 | Michand | 494/54 |
| 5,441,651 A | 8/1995 | Yamaguchi et al. | 210/780 |
| 5,445,771 A | 8/1995 | Degen | 264/22 |
| 5,500,122 A | 3/1996 | Schwartz | 210/321.75 |
| 5,550,022 A | 8/1996 | Chakraborty et al. | 435/6 |
| 5,575,910 A | 11/1996 | Karbachsch et al. | 210/321.75 |
| 5,599,271 A | 2/1997 | Eiken | 494/37 |
| 5,601,522 A | 2/1997 | Piramoon | 156/172 |
| 5,601,524 A | 2/1997 | Knelson | 494/29 |
| 5,618,409 A | 4/1997 | Kreill | 210/97 |
| 5,685,980 A | 11/1997 | Patapoff et al. | 210/244 |
| 5,725,767 A | 3/1998 | Culkin | 210/321.75 |
| 5,759,744 A | 6/1998 | Brueck et al. | 430/312 |
| 5,779,619 A | 7/1998 | Borgstrom et al. | 494/56 |
| 5,792,037 A | 8/1998 | Bodelson et al. | 494/40 |
| 5,820,767 A | 10/1998 | Kane et al. | 210/787 |
| 5,824,217 A | 10/1998 | Perl et al. | 210/321.75 |
| 5,922,201 A | 7/1999 | Yamamori | 210/321.79 |
| 5,979,668 A | 11/1999 | Kane et al. | 210/446 |
| 6,033,564 A | 3/2000 | Kirker et al. | 210/232 |
| 6,106,715 A | 8/2000 | Thalmann et al. | 210/321.83 |
| 6,149,572 A | 11/2000 | Knelson | 494/37 |
| 6,149,810 A | 11/2000 | Gonzalez-Martin et al. | 210/321.84 |
| 6,161,435 A | 12/2000 | Bond et al. | 73/587 |
| 6,221,255 B1 | 4/2001 | Vadoothker | 210/739 |
| 6,248,053 B1 | 6/2001 | Ehnstrom et al. | 494/56 |
| 6,312,610 B1 | 11/2001 | Kirker et al. | 210/781 |
| 6,322,698 B1 | 11/2001 | Rios et al. | 210/321.75 |
| 6,332,913 B1 | 12/2001 | Breitschwerdt et al. | 95/55 |
| 6,358,193 B1 | 3/2002 | Nyberg | 494/2 |
| 6,387,271 B1 | 5/2002 | Geibel et al. | 210/651 |
| 6,390,964 B1 | 5/2002 | Mackel | 494/14 |
| 6,416,666 B1 | 7/2002 | Salyer et al. | 210/321.75 |
| 6,468,198 B1 | 10/2002 | Mackel | 494/37 |
| 6,565,747 B1 | 5/2003 | Shintani et al. | 210/321.74 |
| 6,602,325 B1 | 8/2003 | Frost et al. | 95/96 |
| 6,613,231 B1 | 9/2003 | Jitariouk | 210/650 |
| 6,656,356 B2 | 12/2003 | Gungerich et al. | 210/321.8 |
| 6,673,242 B1 | 1/2004 | Herron | 210/321.74 |
| 6,685,832 B2 | 2/2004 | Mahendran et al. | 210/321.8 |
| 6,702,941 B1 | 3/2004 | Haq et al. | 210/315 |
| 6,706,180 B2 | 3/2004 | Kirker et al. | 210/232 |
| 6,706,189 B2 | 3/2004 | Rabie et al. | 210/636 |
| 6,708,957 B2 | 3/2004 | Cote et al. | 261/23.1 |
| RE38,494 E | 4/2004 | Kirker et al. | 210/232 |
| 6,739,459 B1 | 5/2004 | Hartmann | 210/457 |
| 6,755,969 B2 | 6/2004 | Kirker et al. | 210/232 |
| 6,770,202 B1 | 8/2004 | Kidd et al. | 210/650 |
| 6,787,046 B2 | 9/2004 | De Kock et al. | 210/748 |
| 6,805,805 B2 | 10/2004 | Kirker et al. | 210/781 |
| 6,893,563 B2 | 5/2005 | Grummert | 210/321.84 |
| 6,919,006 B2 | 7/2005 | Ogle | 204/600 |
| 6,932,913 B2 | 8/2005 | Kirker et al. | 210/781 |
| 6,971,525 B2 | 12/2005 | Kirker et al. | 210/384 |
| 7,008,540 B2 | 3/2006 | Weavers et al. | 210/636 |
| 2002/0158008 A1 | 10/2002 | Kirker et al. | 210/512.1 |
| 2004/0016699 A1 | 1/2004 | Bayevsky | 210/636 |

| | | | |
|---|---|---|---|
| 2004/0178138 A1 | 9/2004 | Kirker et al. | 210/360.1 |

FOREIGN PATENT DOCUMENTS

| | | | |
|---|---|---|---|
| DE | 1755388 | 10/1957 | |
| DE | 1632324 | 10/1970 | |
| DE | 3409107 | 9/1985 | |
| EP | 0346056 | 12/1989 | |
| FR | 870540 | 3/1942 | 14/6 |
| FR | 1038726 | 10/1953 | |
| JP | 2307587 | 12/1990 | |
| JP | 11330379 | 10/1999 | |
| JP | 2001113204 A | 4/2001 | |
| WO | 00/02663 | 1/2000 | |
| WO | 02/42004 A1 | 5/2002 | |

OTHER PUBLICATIONS

International Search Report PCT/US 02/13186, Sep. 10, 2002.
International Search Report PCT/US 02/36830, 8 pages, Mar. 12, 2003.
International Search Report PCT/US04/07384, 11 pages, Mailed Sep. 15, 2004.
International Search Report and Written Opinion for application No. PCT/US04/24664, 10 pages, mailing date Mar. 3, 2005.
International Search Report and Written Opinion for application No. PCT/US04/20528, 13 pages, mailing date Jun. 25, 2004.
PCT Search Report, PCT/US2004/007384, 7 pages, mailing date Mar. 11, 2003.
Notification Concerning Transmittal of copy of International Preliminary Report on Patentability; PCT/US2004/024664, mailed Feb. 9, 2006.
Notification Concerning Transmittal of copy of International Preliminary Report on Patentability; PCT/US2004/024661, mailed Feb. 9, 2006.
PCT International Search Report and Written Opinion, PCT/US04/24661, 9 pages, mailing date Dec. 9, 2004.
PCT International Search Report PCT/US04/32817, 13 pages, mailing date Jan. 19, 2005.
International Search Report for EP Application No. 04719722 (4 pages), Sep. 19, 2006.
Supplemental European Search Report for Application No. 04719722 (5 pages), Jan. 18, 2007.

CENTRIFUGE WITH CONTROLLED DISCHARGE OF DENSE MATERIAL

CROSS REFERENCE TO RELATED APPLICATION

This application claims priority from U.S. Provisional Application Ser. No. 60/454,448 filed Mar. 11, 2003, and entitled "Method for more efficiently valving imperforate bowl centrifuges."

TECHNICAL FIELD OF THE INVENTION

This disclosure relates in general to the field of centrifugal devices, and more particularly to a centrifuge with controlled discharge of dense material.

BACKGROUND OF THE INVENTION

Over the past several years, demand has increased for the efficient removal of contaminants from water supplies. Because of their relatively small size, many light density contaminants (e.g., microorganisms) have failed to be removed by conventional processing methods including fluid separation.

Fluid separation may include any process that captures and removes materials from a liquid stream, typically resulting in a clarified liquid having reduced contaminants and a denser stream containing removed contaminants. Further treating the denser stream in a thickening process may remove additional liquid to leave a thick, pump-able slurry mixture containing nine to approximately twelve percent solids by weight. Under certain conditions, a de-watering process may remove more water from the slurry mixture. The de-watering process may create a stackable but still moist mixture of approximately twelve to thirty percent solids by weight. In an extreme de-watering process, the resulting mixture may comprise up to forty percent solids by weight. In treating a clarified liquid, an associated clarifying process may remove suspended solid particles leaving a substantially further clarified fluid.

One type of fluid separation technique may include a membrane filtration process. Typically, a membrane filtration process removes particles from a liquid by retaining the particles in a filter of a specific size suited for a particular application. Some examples of membrane filtration processes include microfiltration, ultrafiltration, and nanofiltration. For insoluble particles, microfiltration can be used to retain and remove these particles from a liquid. Ultrafiltration may define a purification process that serves as a primary purification filter to isolate a desired solid product of a specific size. A nanofiltration process may be used in a final purification process to remove contaminants as small as microscopic bacterial cyst.

Another example of a fluid separation technique may include centrifugal separation. In centrifugal separation, a centrifuge may use centrifugal force to separate more dense contaminants from a fluid medium to leave a clarified fluid. By creating a centrifugal force several times greater than gravity, more dense contaminants separate from the fluid medium. To create centrifugal force within the centrifuge, the fluid medium is often placed within a chamber that rotates along a symmetrical axis creating the centrifugal force in a radial direction away from the symmetrical axis. More dense contaminants suspended in the fluid medium are forced against an outer wall of the rotating chamber and may pass through openings in the chamber to an outer catchment basin. The resulting clarified fluid, which is less dense, remains near the axis of rotation and may typically be removed from the chamber via a clarified fluid outlet.

One method of controlling a centrifugal separation process is to control the release of the more dense contaminants from the rotating chamber. To control this release, the opening in the chamber may be used to vary the amount of more dense contaminants moving through the passage. Some of the problems associated controlling the release of more dense contaminants through the opening include the direction of valve movement, the location of the valve members, and the location of the actuator for controlling the valve.

SUMMARY OF THE INVENTION

In accordance with teachings of the present invention, disadvantages and problems associated with a centrifuge have been substantially reduced or eliminated. In one embodiment, a centrifuge for removing more dense material from a fluid medium includes a fluid separation wall placed within a sleeve to form a containment zone therebetween. The containment zone receives a portion of the fluid medium having a greater concentration of the more dense material. The fluid separation wall aligned generally parallel to an axis of rotation and rotates relative to the axis of rotation. At least one receptacle forming a part of the fluid separation wall such that the at least one receptacle includes a void area. The at least one receptacle operable to aid in separation of the more dense material from the fluid medium. At least one opening extending through the fluid separation wall from the void area to the outer surface of the receptacle. The at least one opening operable to transport the more dense material to the containment zone. A valve ring forming a part of the fluid separation wall. The valve ring including at least one valve orifice formed in the valve ring. The valve ring having a first position which blocks the more dense material from exiting the receptacle and a second position that allows the more dense material to exit the fluid separation wall and move into the containment zone.

In another embodiment, a centrifuge for removing more dense material from a fluid medium including a fluid separation wall placed within a non-rotating sleeve to form a containment zone therebetween. The containment zone operable to receive a portion of the fluid medium having a greater concentration of the more dense material. The fluid separation wall aligned generally parallel to an axis of rotation and operable to rotate relative to the axis of rotation. At least one receptacle forming a part of the fluid separation wall such that the at least one receptacle includes a void area. The at least one receptacle operable to aid in separation of the more dense material from the fluid medium. At least one opening extending through the fluid separation wall from the void area to the outer surface of the receptacle. The at least one opening operable to transport the more dense material to the containment zone. A valve ring forming a part of the fluid separation wall, the valve ring including at least one valve orifice formed in the valve ring. The valve ring aligned perpendicular to the axis of rotation and operable to slide along the fluid separation wall to move between open and closed positions. The at least one valve orifice operable to align with the at least one opening such that the more dense material exits the fluid separation wall and moves into the containment zone.

In a further embodiment of the present invention, a method of separating more dense material from a fluid medium in a centrifuge includes rotating a fluid separation wall around an axis of rotation within the centrifuge to produce a centrifugal force that causes the more dense material in the fluid medium to separate from the fluid medium. The method further includes compressing the separated more dense material in at least one flow path of a receptacle by blocking at least a portion of the at least one flow path with a portion of a valve ring. The method further includes moving the valve ring along an outer surface of the fluid separation wall to release the more dense material compressed within the flow path such that the more dense material exits the fluid separation wall.

In yet another embodiment of the present invention, a fluid separation wall for separating more dense material from a fluid medium in a centrifuge includes a generally circular wall formed around an axis of rotation with an inner surface and an outer surface such that the outer surface is further from the axis of rotation than the inner surface. The wall including at least one receptacle, the wall operable to receive a fluid medium having more dense material. An opening formed in the wall. The opening extending from the at least one receptacle through the wall from the inner surface to the outer surface. A valve ring having at least one orifice and formed over the opening. The valve ring operable to slide along the outer surface of the wall such that the at least one orifice aligns with the opening.

Other technical advantages will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention and their advantages are best understood by reference to FIGS. 1 through 13 where like numbers are used to indicate like and corresponding parts.

Figure 1:
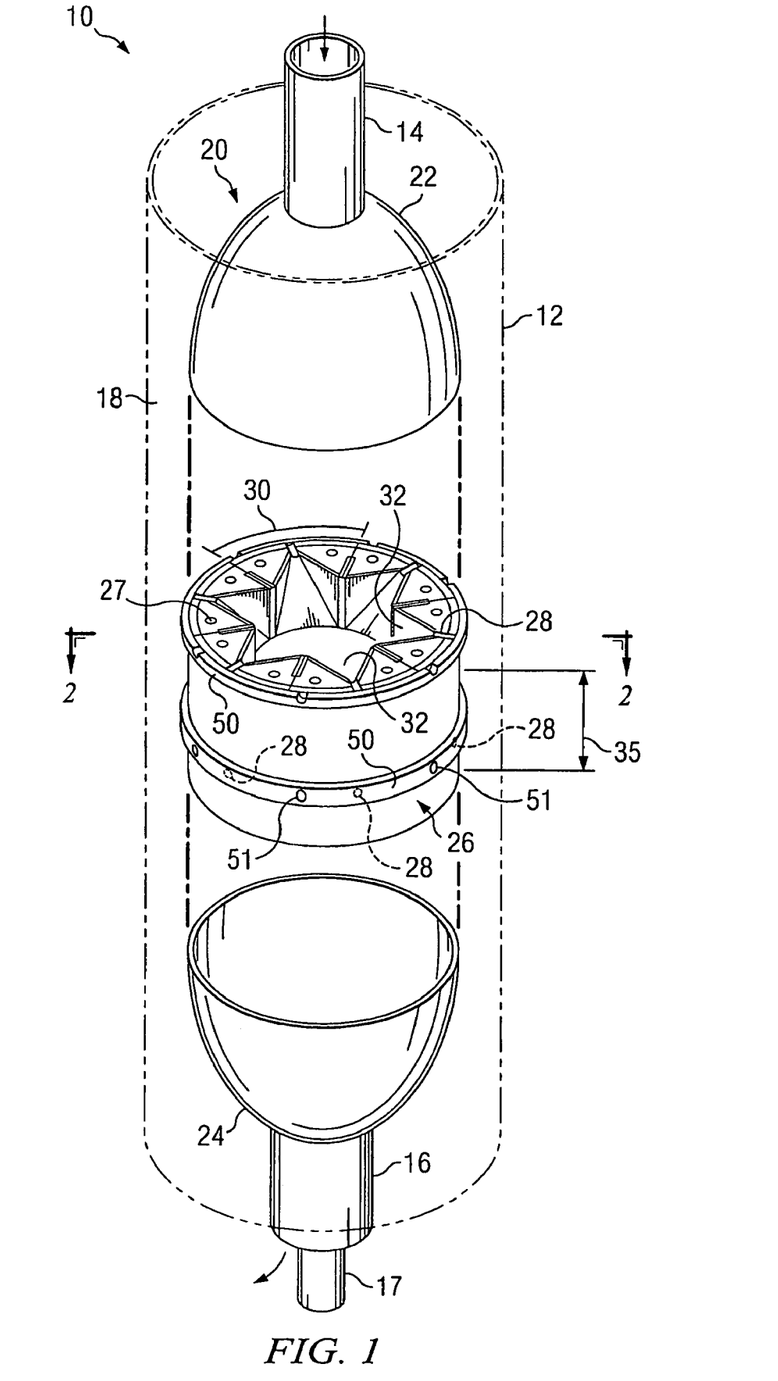
FIG. 1 illustrates a schematic drawing showing an isometric view with portions broken away of a centrifuge incorporating teachings of the present invention.

FIG. 1 illustrates a schematic drawing showing an isometric view with portions broken away of an example embodiment of centrifuge 10. Centrifuge 10 may include centrifugal core 20 disposed within non-rotating outer sleeve 12. Centrifugal core 20 may include fluid medium inlet 14, clarified fluid outlet 16, and fluid separation wall 26. Fluid separation wall 26 may be encapsulated between first housing cover 22 and second housing cover 24.

Non-rotating outer sleeve 12 may form accumulation area or containment zone 18 between centrifugal core 20 and non-rotating outer sleeve 12. Accumulation area 18 may collect more dense particles and other contaminants that have been separated from the fluid medium and have passed through openings 28. As the more dense particles collect within accumulation area 18, the heavy density particles may flow between centrifugal core 20 and non-rotating outer sleeve 12 away from centrifuge 10.

Fluid medium inlet 14 may be attached to upper housing cover 22 to provide an opening into centrifuge 10 for the fluid medium. Although fluid medium inlet 14 is shown attached to first housing cover 22, fluid medium inlet 14 may be positioned at any location on centrifugal core 20.

Clarified fluid outlet 16 may be formed in second housing cover 24. Clarified fluid outlet 16 may be used for removal of the clarified fluid after the more dense particles are removed through openings 28 in fluid separation wall 26.

Fluid separation wall 26 may be disposed between first housing cover 22 and second housing cover 24. First housing cover 22 and second housing cover 24 may be used to form the end pieces of centrifugal core 20 with fluid separation wall 26 disposed therebetween. Fluid separation wall 26 may be formed from various sections and include various receptacles with respective geometries and shapes. These various sections 35 may include several horizontal layers of receptacles stacked together to form fluid separation wall 26. Alternatively, fluid separation wall 26 may be formed from several vertical columns (not expressly shown) of receptacles placed together to form fluid separation wall 26. For some embodiments, first housing cover 22 and second housing cover 24 may be attached with long bolts (not expressly shown) through bolt holes 27 to hold together the various sections and components of fluid separation wall 26.

Centrifugal core 20 is designed to rotate within non-rotating sleeve 12. This rotation may create a centrifugal force to separate the more dense particles from a fluid medium. In some embodiments, a transmission shaft 17 rotates centrifugal core 20 to create the centrifugal force. The rotation of transmission shaft 17 develops the centrifugal force within centrifugal core 20 in the range of approximately five hundred to approximately eight thousand gravities, depending on the speed and the diameter of centrifugal core 20. By providing a large centrifugal force within centrifugal core 20 such as eight thousand gravities, more dense particles as small as approximately 0.5 microns in size may be separated from the fluid medium. In some embodiments, centrifuge 10 imparts a centrifugal force on the fluid medium for removal of particulate matter in the range of approximately three millimeters to approximately 0.5 microns.

Figure 2:
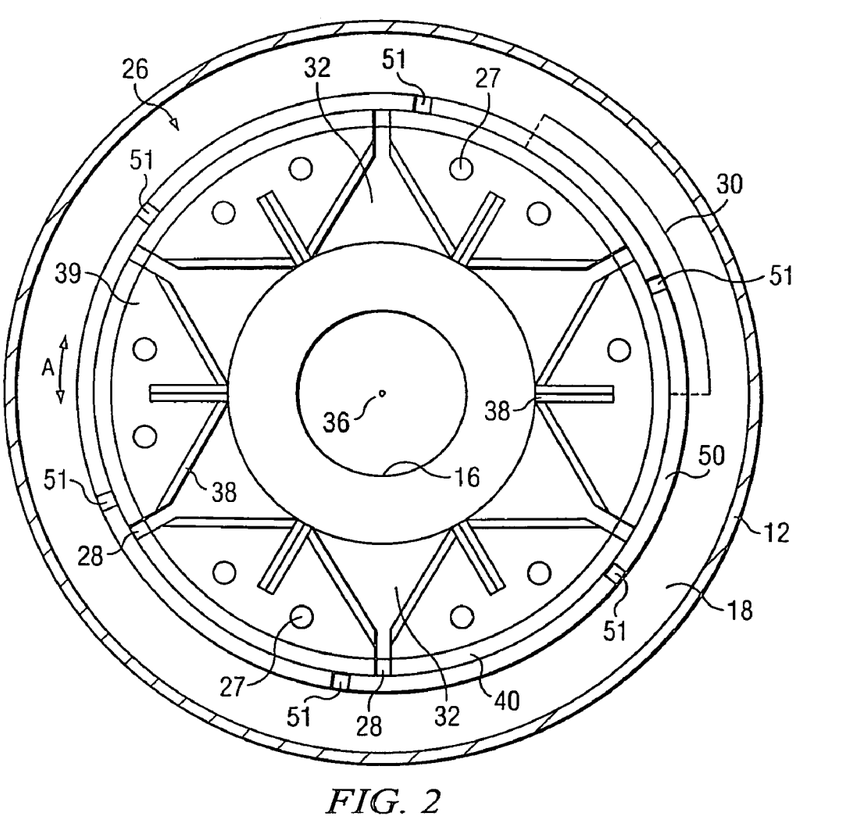
FIG. 2 illustrates a schematic drawing in section taken along lines 2-2 of FIG. 1.

As the fluid is affected by the centrifugal force, the varying densities within the fluid medium are separated with the heavier, more dense particles being forced towards non-rotating outer sleeve 12. As these more dense particles approach opening 28 in fluid separation wall 26, the centrifugal force is at its maximum due to the distance from axis of rotation 36, as shown in FIG. 2. Typically, the particles exiting through openings 28 are disposed on non-rotating outer sleeve 12. The remaining fluid, or clarified fluid, contained within the innermost part of fluid separation wall 26 may overflow centrifugal core 20 into clarified fluid outlet 16. Depending upon the extraction rate of the particles, additional fluid medium may be placed within centrifugal core 20. Typically, the flow rate of fluid medium into centrifugal core 20 may be in the range of approximately thirty to approximately five hundred gallons per minute. In some embodiments, the flow rate of the fluid medium is approximately sixty to one hundred and twenty-five gallons per minute.

Fluid separation wall 26, encased within first housing cover 22 and second housing cover 24, may include receptacle 30 formed on fluid separation wall 26. Receptacle 30 may include a specific geometry and a specific shape forming void area 32 that leads to opening 28. Depending on the respective geometry and shape of receptacle 30, the centrifugal forces within receptacle 30 may alter the separation effects of the more dense particles from the fluid medium.

Valve ring 50 may be formed on or coupled to an outer section or periphery of fluid separation wall 26. As such, valve ring 50 may, at times, rotate in conjunction with fluid separation wall 26. However, in some embodiments, valve ring 50 is allowed to slide and rotate independently of fluid separation wall 26.

Because the outer section of fluid separation wall 26 encounters high centrifugal forces, valve ring 50 may be formed in a hoop or ring shape that fits around the circumference of fluid separation wall 26. The ring shape may help in preventing deformation of valve ring 50 under high centrifugal force. Valve ring 50 is typically placed over openings 28 to control the flow of more dense material from exiting the receptacle 30. In some instances where centrifuge 10 is constructed in several sections 35, each section 35 may include a respective valve ring 50.

In order to permit the more dense material to exit receptacle 30 and move into containment zone 18, valve ring 50 includes at least one valve orifice 51. Typically, valve ring 50 includes a plurality of valve orifices 51 that are designed to align with each opening 28 formed in section 35. In most instances, valve orifices 51 are designed to simultaneously align with a respective opening 28 to form an open position. Yet in other alternate embodiments, valve ring 50 may be designed such that one or more openings 28 align with one or more valve openings 51 while other openings 28 remain blocked by their respective valve orifice 51.

Valve ring 50 may include a first position and a second position. In the first position, valve orifices 51 of valve ring 50 are offset from respective openings 28 such that at least a portion of opening 28 is covered to block the more dense material from exiting receptacle 30. In the second position, valve ring 50 moves or slides to substantially align valve orifices 51 with openings 28 to allow the more dense material to exit fluid separation wall 26 and move into containment zone 18. Typically, valve ring 50 is biased to move from the second position to the first position such as a default position.

FIG. 2 illustrates a cross-sectional view of centrifuge 10. Fluid separation wall 26 may be formed from a single layered wall (not expressly shown) or from a composite of different wall layers such as inner surface 38, middle layer 39, and outer surface 40 arranged around axis of rotation 36. Generally, each section 35 of fluid separation wall 26 includes at least one receptacle 30 having at least one opening 28. In some embodiments, centrifugal core 20 may include bolt holes 27 to receive long bolts (not expressly shown) that may hold segments (e.g., section 35) of fluid separation wall 26 in a fixed position.

Opening 28 may provide a flow path for the more dense material or particles, combined with some fluid medium, to be removed from receptacle 30 to accumulation area 18. Typically, opening 28 may include a nozzle formed in receptacle 30, an insert device, or any suitable connection to provide a path for the more dense particles to travel out of receptacle 30 to accumulation area 18.

Because centrifugal core 20 may be centered on axis of rotation 36, the rotation of centrifugal core 20 may create a centrifugal force with the force being directed away from axis of rotation 36. As the fluid medium enters centrifugal core 20, the heavy particles within the fluid medium are driven outwards in a radial direction extending from axis of rotation 36 from void area 32 towards receptacle 30. The centrifugal force created by the rotation of centrifuge core 20 may increase as the particles more further away from axis of rotation 36. The increasing force may force the more dense particles out through opening 28 to be disposed in accumulation area 18 formed between non-rotating outer sleeve 12 and centrifugal core 20. Typically, opening 28 forms a part of receptacle 30, allowing for heavy sediment particles and some fluid medium to pass through receptacle 30 from inner surface 38 of fluid separation wall 26 to the non-rotating outer sleeve 12.

Valve ring 50 may be in a default closed position or, in some instances, biased to a closed position. In the closed position, valve ring 50 blocks or at least partially restricts some or all of opening 28. Due to the blockage, the more dense material packs inside of opening 28. Generally, the packing (e.g., compression or compaction) of the more dense material squeezes or removes more clarified fluid from the more dense material. As such, the compression of the more dense material may be used to control the amount of "de-watering" or percentage of fluid expelled with the more dense material.

After de-watering of the more dense material, valve ring 50 may be actuated to move or rotate to an open position. In some embodiments, valve ring 50 may rotate independently from fluid separation wall 26 such that valve ring 50 slides over the surface of fluid separation wall 26 as indicated by arrow A. In the example embodiment, valve ring 50 is able to slide or rotate relative to outer surface 40 until valve orifices 51 align with openings 28. As shown, valve orifices 51 are designed to simultaneous "open" all of openings 28.

Figure 3:
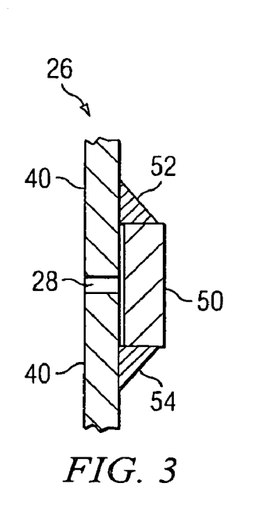
FIG. 3 illustrates a cross sectional side view of a portion of the fluid separation wall incorporating teachings of the present invention.

FIG. 3 illustrates a cross-sectional side view of a portion of fluid separation wall 26. In some embodiments, valve ring 50 is coupled to the outer periphery of fluid separation wall 26 such as outer surface 40.

In order to retain valve ring 50 over openings 28, valve ring 50 may be maintained or restricted in place using upper wedge 52 and lower wedge 54. By using upper wedge 52 and lower wedge 54, valve ring 50 in prevented from moving off center and is limited to rotational movements only. As such, upper wedge 52 and lower wedge 54 may be used to align valve ring 50 such that valve orifice 51 aligns with opening 28.

Figure 4A:
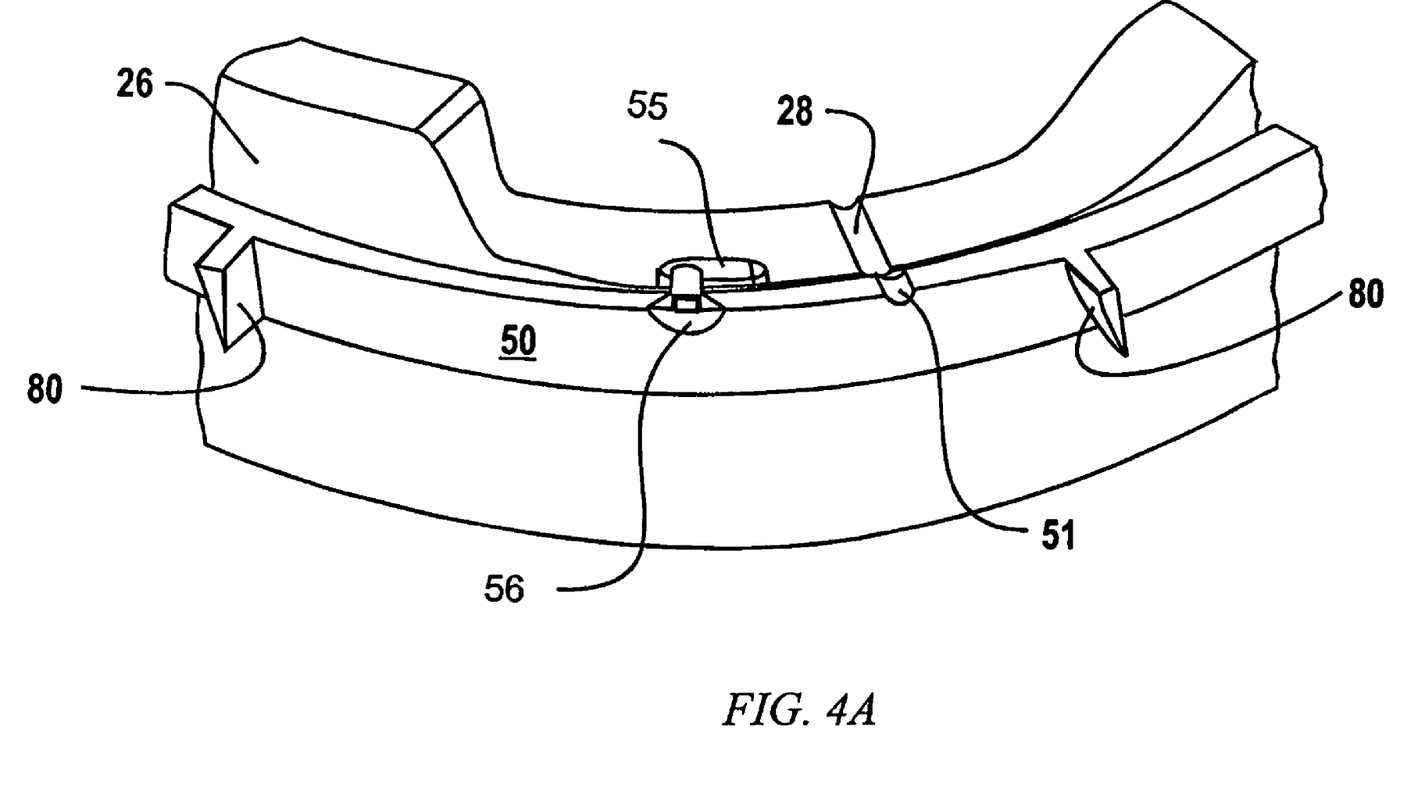
FIG. 4A illustrates a perspective view of the fluid separation wall with portions cut-away showing an example embodiment of a pin and slot arrangement for guiding the valve ring incorporating teachings of the present invention.

FIG. 4A illustrates a perspective view of fluid separation wall 26 with portions cut-away showing an example embodiment of a pin and slot arrangement for guiding valve ring 50. One example embodiment for guiding valve ring 50 to align valve orifices 51 with the respective openings 28 includes a pin or bolt 56 set into a guide or wall slot 55. In the present embodiment, the pin is represented by bolt 56. However, the pin may include other objects or structures operable to guide valve ring 50 within wall slot 55. Fluid separation wall 26 further illustrates vanes 80, as described below in more detail.

Wall slot 55 may include any void area, depression or other indention formed in fluid separation wall 26. In other embodiments, wall slot 55 is formed in outer surface 40 (not expressly shown). Wall slot 55 is typically formed in an oval-shaped pattern such that the elongated shape provides the direction of movement with restricted movement along the other direction.

Wall slot 55 is formed to receive a portion of pin or bolt 56. Typically, bolt 56 extends through valve ring 50 and into the void area of wall slot 55 such that the shape of wall slot 55 guides, limits and/or restricts the movement of valve ring 50. Generally, bolt 56 mounts or screws into valve ring 50 in a radially inward direction. Because bolt 56 is typically longer than the thickness of valve ring 50, a portion of bolt 56 extends into wall slot 55 formed in fluid separation wall 26. Once engaged, wall slot 55 guides valve ring 50 via pin or bolt 56 between the first position and the second positions such that valve orifice 51 aligns with respective opening 28 in the second position.

Figure 4B:
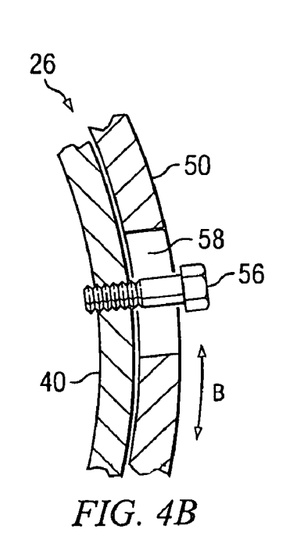
FIG. 4B illustrates a top cross-sectional view of an alternative example embodiment of the pin and slot arrangement for guiding the valve ring incorporating teachings of the present invention.

FIG. 4B illustrates a top cross-sectional view of an alternative example embodiment of the pin and slot arrangement for guiding valve ring 50. In the example embodiment, bolt 56 is secured through slot 58 and into the outer periphery of fluid separation wall 26 (e.g., outer surface 40). Although bolt 56 is illustrated as an example of a pin, the pin may include other objects or structures operable to guide valve ring 50 within slot 58.

Slot 58 may be formed in the oval-shaped pattern and used to guide the movements of valve ring 50. In one embodiment, valve ring 50 is free to move in relation to outer surface 40 in the direction of arrow B. Because slot 58 may include an oval shape, slot 58 may further guide, limit and/or restrict the movement of valve ring 50 such that valve orifice 51 maintains alignment with opening 28.

Figure 5:
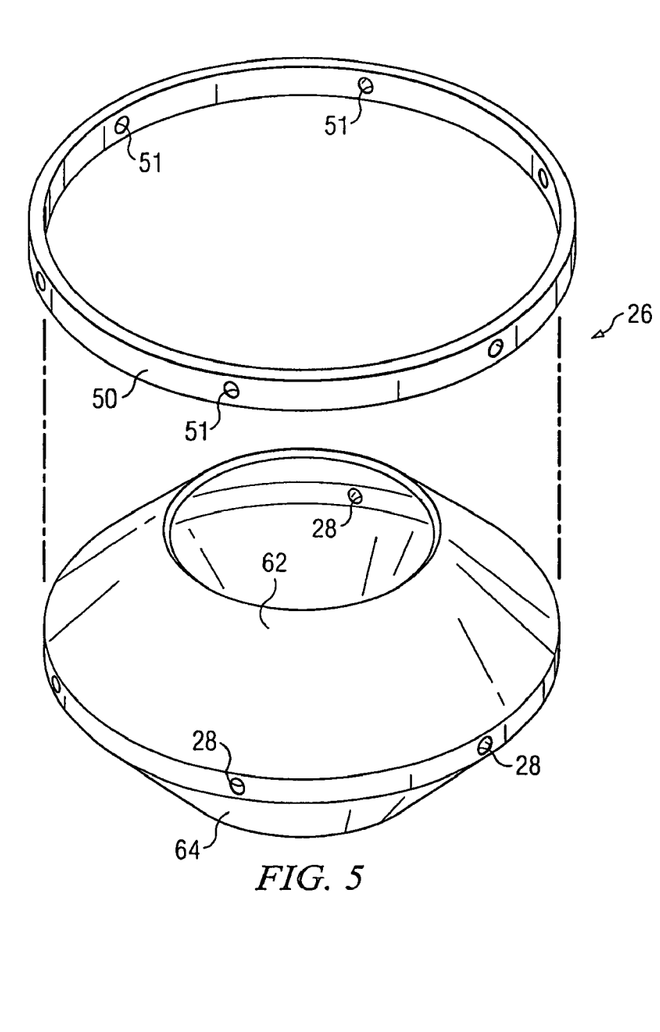
FIGS. 5 and 6 illustrate perspective and isometric views of an example embodiment of a split-cone fluid separation wall including the valve ring according to the teachings of the present invention.
Figure 6:
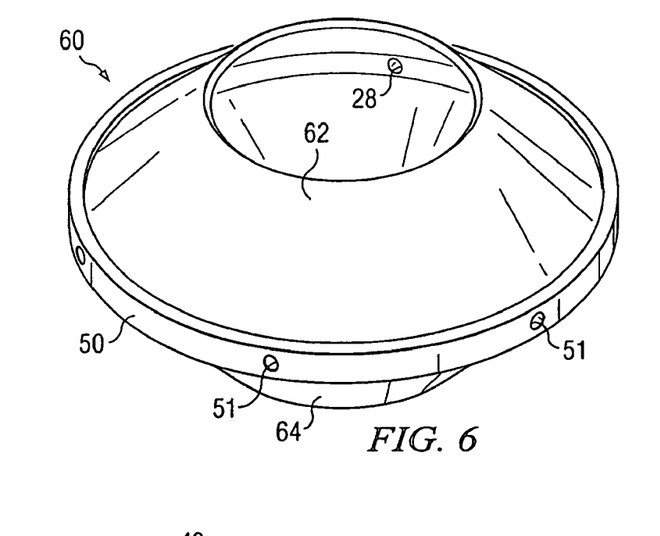

FIGS. 5 and 6 illustrate an example embodiment of split-cone fluid separation wall 60 including valve ring 50. Split-cone fluid separation wall 60 may include other types of centrifuge walls such as nozzle-type or disk type centrifuge walls. Similar to density screen type centrifuge 10, split-cone fluid separation wall 60 may be formed as a part of centrifuge core 20 for use with centrifuge 10 and include similar features as described above.

For example, receptacle 30 may be formed using the split cone design. In certain embodiments, split-cone fluid separation wall 60 may be formed with upper cone 62 that is coupled to lower cone 64. At the ends of the cones, openings 28 may be formed around the periphery of the mated cones. Similarly, valve ring 50 including valve orifice 51 may be fitted over opening 28 to control the release of more dense material from centrifuge 10.

Figure 7:
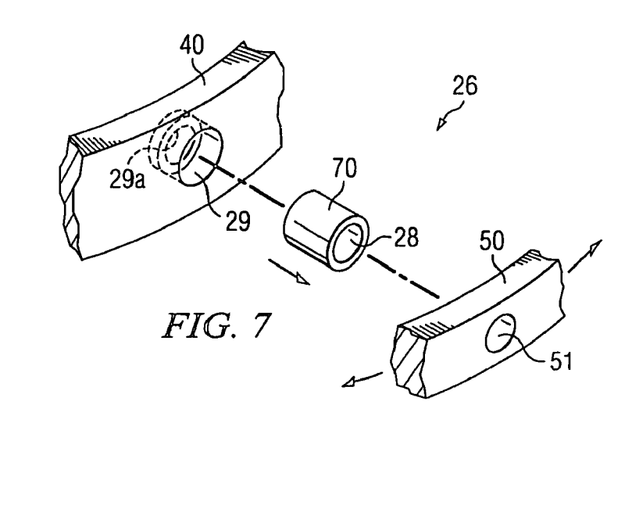
FIG. 7 illustrates an exploded perspective view of a portion of the fluid separation wall including an example embodiment of a self-adjusting wear nozzle placed in an opening sleeve according to the teachings of the present invention.

FIG. 7 illustrates an exploded perspective view of a portion of fluid separation wall 26 including an example embodiment of self-adjusting wear nozzle 70 placed in opening sleeve 29. Typically, self-adjusting wear insert nozzle 70 is a removable nozzle insert that is fitted into opening sleeve 29. Generally, nozzle 70 may be constructed from materials including, but not limited to, metals, ceramics, gems or any other suitable material.

To prevent nozzle 70 from falling into void area 32, opening sleeve 29 may include seat 29a. Seat 29a may include a detent that is formed as part of opening 28. Generally, seat 29a and opening sleeve 29a are formed to allow nozzle 70 to slide radially within opening sleeve 29a but prevents nozzle 70 from falling into the inside part of centrifuge core 20.

During separation of the more dense materials, centrifugal force causes nozzle 70 to press against valve ring 50. The pressure of the centrifugal force allows nozzle 70 to form a good seal against valve ring 50. Over time, the outward force of nozzle 70 against valve ring 50 may cause a slight curved wear on the outer face of nozzle 70 that mates with the inside shape of valve ring 50 to maintain a good seal. Because valve ring 50 maintains nozzle 70 within opening sleeve 29, valve orifices 51, for this embodiment, are formed smaller than nozzle 70.

Figure 8:
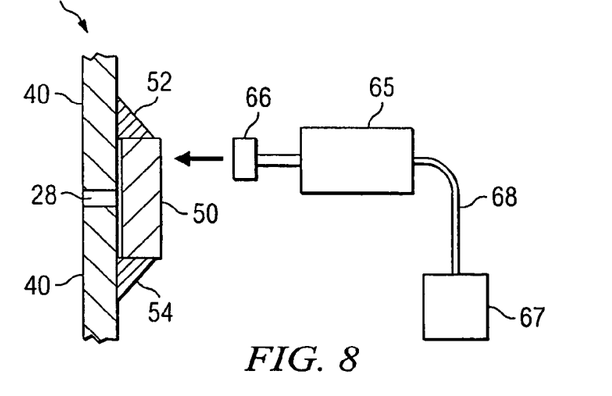
FIG. 8 illustrates a cross-sectional view of an example embodiment of the fluid separation wall including the valve ring that is actuated by a solenoid according to the teachings of the present invention.

FIG. 8 illustrates a cross-sectional view of an example embodiment of fluid separation wall 26 including valve ring 50 that is actuated by solenoid 65. In some embodiments, solenoid 65 may includes electric, mechanical, pneumatic or any other suitable solenoid. Generally, solenoid 65 is placed outside of centrifugal core 20 in the non-rotating area such as being coupled to non-rotating outer sleeve 12.

Brake pad 66 is coupled to the end of solenoid 65 such that upon actuation of solenoid 65, brake pad 66 extends onto the surface of valve ring 50. Typically, such actuation utilizes a momentary or instant switch that causes brake pad 66 to quickly contact and release valve ring 50. The contact causes valve ring 50 to move to between an open and a closed position. For example, valve ring 50 may move to an open position after being contacted with brake pad 66.

Controller 67 may be electrically coupled to solenoid 65 via cable 68. Controller 67 may be used to control the actuation of solenoid 65 based on a variety of predetermined conditions. The predetermined conditions may be used to move valve ring 50 between the first and second position (e.g., closed and open position). Examples of predetermined conditions include pressure levels within fluid separation wall 26, particle characteristics of a clarified fluid stream, a combination of both or any other condition including operating conditions that may be monitored to control the function of centrifuge 10.

In determining the pressure levels within fluid separation wall 26, a pressure sensor or monitor may be coupled to or attached to a portion of fluid separation wall 26 in order to monitor the pressures, as described below in one example embodiment of a pressure sensor. Similarly, particle characteristics may be monitored in the clarified stream using a particle sensor, as described below in more detail.

Valve ring 50 may also vary on the type of actuation or control of the movement. For example, controller 67 may actuate valve ring 50 using an automated actuation such as regular intervals, timed actuation, continuous actuation and intermittent actuation, or manual actuation.

Figure 9:
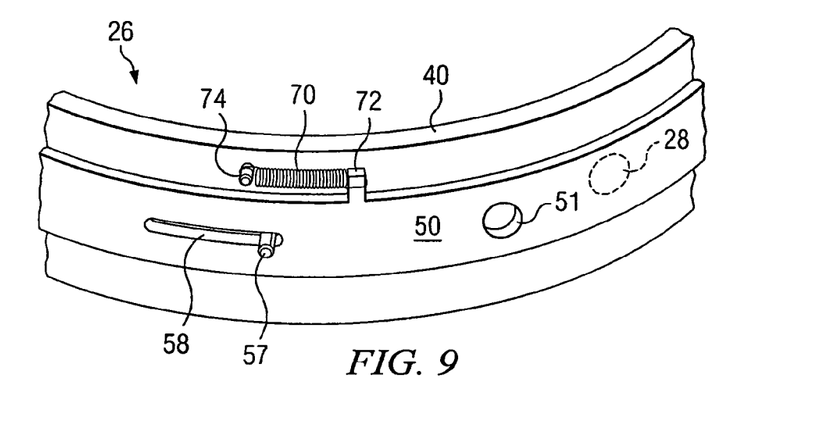
FIGS. 9 and 10 illustrate a perspective view of a portion of the fluid separation wall including the valve ring using a spring to maintain a biased position according to the teachings of the present invention.
Figure 10:
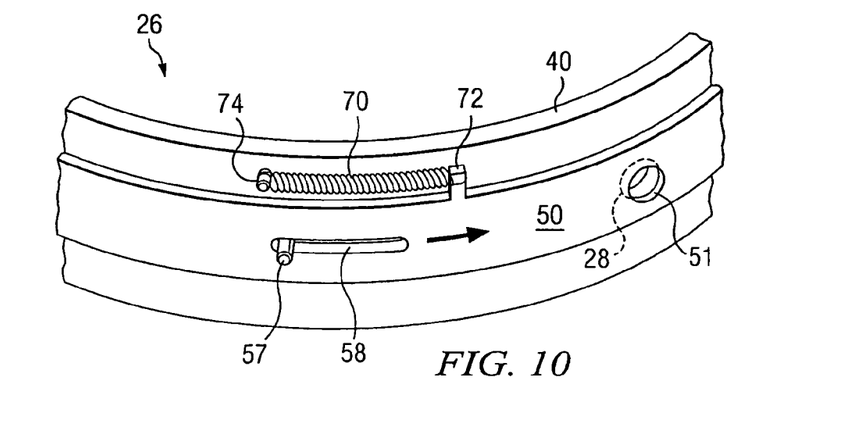

FIGS. 9 and 10 illustrate a perspective view of a portion of fluid separation wall 26 including valve ring 50 using spring 70 to maintain a biased position. In the example embodiment, spring 70 is coupled to fluid separation wall 26 (e.g., outer surface 40) at attachment point 74. The other end of spring 70 is connected to a portion of valve ring 50 such at ring connection point 72.

As illustrated in FIG. 9, spring 70 is biased to a closed position. In the closed position, valve orifice 51 is offset from opening 28. Being offset, valve ring 50 blocks the passage of more dense material from exiting opening 28.

In some embodiments, pin 57 and slot 58 may be used with valve ring 50. As described above, pin 57 and slot may be used to maintain valve ring 50 in alignment with opening 28. In addition to alignment, pin 57 and slot 58 may be used as stops or detents to maintain valve ring 50 in open or closed positions.

Referring to FIG. 10, valve ring 50 is moved to an open position such that valve orifice 51 is, at least partially, aligned with opening 28. To prevent valve ring 50 from extending beyond opening 28, pin 57 may encounter the end of slot 58 to form a detent or stop position. In addition to aiding alignment of valve orifice 51 with opening 28, the stop position may further prevent the over-extension of spring 70. Once the actuation of valve ring 50 has ceased, spring 70 biases valve ring 50 to return to closed position as illustrated in FIG. 9. In alternate embodiments, spring 70 may be biased in open position.

Figure 11:
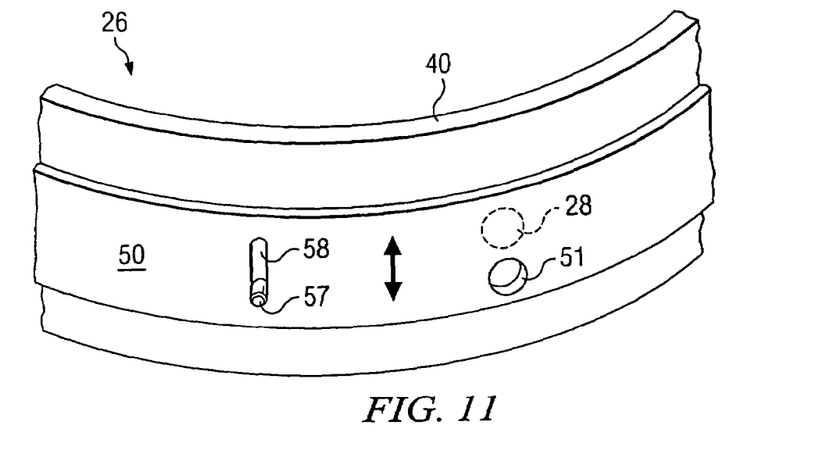
FIG. 11 illustrates an alternative embodiment of the valve ring having a perpendicular range of motion according to the teachings of the present invention.

FIG. 11 illustrates an alternative embodiment of valve ring 50 having a perpendicular range of motion. In some embodiments of the present invention, valve ring 50 may be coupled to fluid separation wall 26 and have a range of motion perpendicular to the rotational motion.

Typically, pin 57 and slot 58 that are used to control the range of motion may be rotated ninety degrees. In this vertical arrangement, slot 58 permits only vertical movement or movements perpendicular to the rotation of fluid separation wall 26. Similarly, pin 57 and slot 58 may be used to guide and maintain alignment of valve ring 50 over opening 28.

Upon activation, valve ring 50 moves up and down, more specifically vertically, along the outer periphery of fluid separation wall 26 (e.g., outer surface 40). By moving between open and closed positions, valve orifice 51 aligns with opening 28 to permit the more dense material to exit opening 28.

Figure 12:
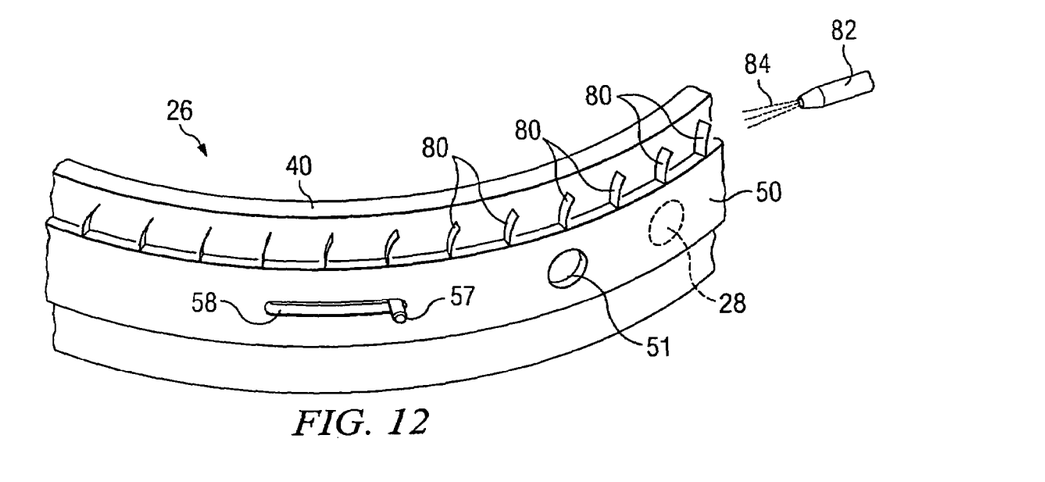
FIG. 12 illustrates an example embodiment of a compressed air control actuator used with the valve ring according to the teachings of the present invention.

FIG. 12 illustrates an example embodiment of a compressed air control actuator used with valve ring 50. Besides solenoid 65 and brake pad 66, valve ring 50 may be actuated using compressed air 84. In some embodiments, compressed air 84 may be directed out of external air nozzle 82 to cause valve ring 50 to move between open and closed positions. In some instances, valve ring 50 may further include vane 80.

One or more vane 80 may be coupled to or formed on valve ring 50. While vane 80 may be added to valve ring 50, vanes 80 are typically formed on valve ring 50 in a manufacturing process such as casting or molding. In some embodiments, vanes 80 project from the surface of valve ring 50 such that they are exposed to compressed air 84 coming from air nozzle 82. Compressed air 84 contacts one or more vanes 80 to move valve ring 50 between open and closed positions.

Figure 13:
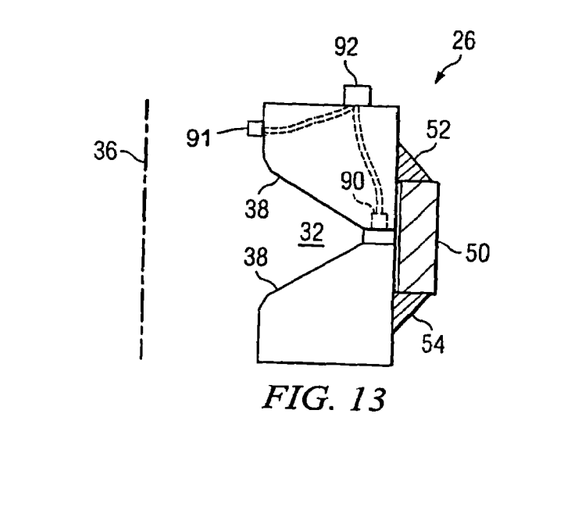
FIG. 13 illustrates a cross-sectional view of fluid separation wall including an example embodiment of a pressure sensor and a particle sensor used to control the actuation of the valve ring according to the teachings of the present invention.

FIG. 13 illustrates a cross-sectional view of fluid separation wall including an example embodiment of pressure sensor 90 and particle sensor 91 used to control the actuation of valve ring 50. As described above, actuation of valve ring 50 may be based on a variety of conditions including an operational parameter. An example of such parameter includes pressure within fluid separation wall 26. As such, pressure sensor 90 may be coupled to an inner surface of fluid separation wall 26 (e.g., inner wall 38) or along a surface of opening 28.

In one example embodiment, pressure sensor 90 is placed along an inner wall of opening 28. As the pressure within opening 28 changes, a signal is sent to actuation controller 92 to cause valve ring 50 to move between open and closed positions.

For example, if valve ring 50 is biased to a closed position, thus blocking the more dense materials within opening 28. The pressure within opening 28 may begin to increase. Upon reaching a predetermined pressure limit, actuation controller 92 causes valve ring 50 to move to a second or "open" position to release the more dense material from opening 28. As the pressure within opening 28 decreases, actuation controller 92 may cause valve ring 50 to return to the biased first or "closed" position.

Centrifuge 10 may cause the actuation of valve ring 50 based on a determination of particle characteristics of the clarified fluid stream. In some embodiments, particle sensor 91 may be coupled to a portion of fluid separation wall 26 such that a portion of the clarified fluid passes over particle sensor 91. Particle sensor 91 may further be in communication with actuation controller 92. Because particle characteristic may indicate operational characteristics of the centrifuge, actuation controller 92 may cause valve ring 50 to actuate based on the particle characteristics reaching a predetermined level.

In other embodiments, actuation controller 92 may receive determinations from both pressure sensor 90 and particle sensor 91 to cause the actuation of valve ring 50.

Although the disclosed embodiments have been described in detail, it should be understood that various changes, substitutions and alterations can be made to the embodiments without departing from their spirit and scope.

What is claimed is:

1. A centrifuge for removing more dense material from a fluid medium, comprising:
   a fluid separation wall placed within a sleeve to form a containment zone therebetween;
   the containment zone operable to receive a portion of the fluid medium having a greater concentration of the more dense material;
   the fluid separation wall aligned generally parallel to an axis of rotation and operable to rotate relative to the axis of rotation;
   at least one receptacle forming a part of the fluid separation wall such that the at least one receptacle includes a void area;
   the at least one receptacle operable to aid in separation of the more dense material from the fluid medium;
   at least one opening extending through the fluid separation wall from the void area to the outer surface of the receptacle;
   the at least one opening operable to transport the more dense material to the containment zone;
   a valve ring forming a part of the fluid separation wall, the valve ring including at least one valve orifice formed in the valve ring; and the valve ring having a first position which blocks the more dense material from exiting the receptacle and a second position that allows the more dense material to exit the fluid separation wall and move into the containment zone.

2. The centrifuge of claim 1, wherein the fluid separation wall further comprises a plurality of the receptacles, each receptacle formed in the void area and having one or more respective openings.

3. The centrifuge of claim 1, wherein the centrifuge comprises a split-cone centrifuge.

4. The centrifuge of claim 1, further comprising a detent or stop formed in the valve ring, the detent operable to maintain the valve ring in the first position.

5. The centrifuge of claim 1, further comprising a pressure sensor operably coupled to the fluid separation wall, the pressure sensor operable to determine pressures within the fluid separation wall.

6. The centrifuge of claim 1, further comprising an actuator operable to cause the valve ring to move between the first position and the second position.

7. The centrifuge of claim 6, wherein the actuator comprises a brake pad and a solenoid operable to engage a portion of the valve ring to cause the valve ring to move between the first position and the second position.

8. The centrifuge of claim 6, further comprising a controller operable to control the actuation of the actuator.

9. The centrifuge of claim 1, further comprising at least one vane disposed on the valve ring, the at least one vane operable to interact with compressed air to cause the valve ring to move between the first position and the second position.

10. The centrifuge of claim 1, further comprising a spring coupled between an outer section of the fluid separation wall and the valve ring, the spring operable to bias the valve ring toward the first position.

11. A centrifuge for removing more dense material from a fluid medium, comprising:
   a fluid separation wall placed within a sleeve to form a containment zone therebetween;
   the containment zone operable to receive a portion of the fluid medium having a greater concentration of the more dense material;
   the fluid separation wall aligned generally parallel to an axis of rotation and operable to rotate relative to the axis of rotation;
   at least one receptacle forming a part of the fluid separation wall such that the at least one receptacle includes a void area;
   the at least one receptacle operable to aid in separation of the more dense material from the fluid medium;
   at least one opening extending through the fluid separation wall from the void area to the outer surface of the receptacle;
   the at least one opening operable to transport the more dense material to the containment zone;
   a valve ring forming a part of the fluid separation wall, the valve ring including at least one valve orifice formed in the valve ring;
   the valve ring having a first position which blocks the more dense material from exiting the receptacle and a second position that allows the more dense material to exit the fluid separation wall and move into the containment zone;
   a pin operably engaged with the fluid separation wall, the pin extending radially from the fluid separation wall; and
   a slot formed in the valve ring, the slot operably formed to receive the pin therethrough and to guide the valve ring between the first position and the second position such that a valve orifice aligns with the respective opening in the second position.

12. A centrifuge for removing more dense material from a fluid medium, comprising:
   a fluid separation wall placed within a sleeve to form a containment zone therebetween;
   the containment zone operable to receive a portion of the fluid medium having a greater concentration of the more dense material;
   at least one receptacle forming a part of the fluid separation wall such that the at least one receptacle includes a void area;
   the at least one receptacle operable to aid in separation of the more dense material from the fluid medium;
   at least one opening extending through the fluid separation wall from the void area to the outer surface of the receptacle;
   the at least one opening operable to transport the more dense material to the containment zone;
   a valve ring forming a part of the fluid separation wall, the valve ring including at least one valve orifice formed in the valve ring;
   the valve ring having a first position which blocks the more dense material from exiting the receptacle and a second position that allows the more dense material to exit the fluid separation wall and move into the containment zone;
   a pin operably engaged with the valve ring, the pin extending radially through the valve ring to engage a slot; and
   the slot formed in the fluid separation wall, the slot operably formed to receive the pin and to guide the valve ring between the first position and the second position such that a valve orifice aligns with the respective opening in the second position.

13. The centrifuge of claim 12, wherein the slot comprises an oval shaped slot operably designed to restrict the movement of the valve ring.

14. The centrifuge of claim 12, wherein the pin comprises a bolt.

15. A centrifuge for removing more dense material from a fluid medium, comprising:
   a fluid separation wall placed within a sleeve to form a containment zone therebetween;
   the containment zone operable to receive a portion of the fluid medium having a greater concentration of the more dense material;
   the fluid separation wall aligned generally parallel to an axis of rotation and operable to rotate relative to the axis of rotation;
   at least one receptacle forming a part of the fluid separation wall such that the at least one receptacle includes a void area;
   the at least one receptacle operable to aid in separation of the more dense material from the fluid medium;
   at least one opening extending through the fluid separation wall from the void area to the outer surface of the receptacle;
   the at least one opening operable to transport the more dense material to the containment zone;
   a valve ring forming apart of the fluid separation wall;
   the valve ring having a first position which blocks the more dense material from exiting the receptacle and a second position that allows the more dense material to exit the fluid separation wall and move into the containment zone;

an upper wedge coupled to the fluid separation wall, the upper wedge operable to restrict the movement of the valve ring; and a lower wedge coupled to the fluid separation wall, the lower wedge operable to restrict the movement of the valve ring.

16. A centrifuge for removing more dense material from a fluid medium, comprising:

a fluid separation wall placed within a non-rotating sleeve to form a containment zone therebetween;

the containment zone operable to receive a portion of the fluid medium having a greater concentration of the more dense material;

the fluid separation wall aligned generally parallel to an axis of rotation and operable to rotate around the axis of rotation;

at least one receptacle forming a part of the fluid separation wall such that the at least one receptacle includes a void area, the at least one receptacle operable to aid in separation of the more dense material from the fluid medium;

at least one opening extending through the fluid separation wall from the void area to the outer surface of the receptacle;

the at least one opening operable to transport the more dense material to the containment zone;

a valve ring forming a part of the fluid separation wall, the valve ring including at least one valve orifice formed in the valve ring;

the valve ring aligned perpendicular to the axis of rotation and operable to slide along the fluid separation wall to move between open and closed positions; and the at least one valve orifice operable to align with the at least one opening such that the more dense material exits the fluid separation wall and moves into the containment zone.

17. The centrifuge of claim 16, further comprising a wear insert nozzle disposed in the opening, the wear insert nozzle operable to seat against the valve ring and guide the more dense material from the receptacle to the containment zone.

18. The centrifuge of claim 17, wherein the size of the orifice is smaller than the size of the wear insert nozzle.

19. The centrifuge of claim 17, wherein the wear insert nozzle comprise replaceable wear insert nozzles.

20. A fluid separation wall for separating more dense material from a fluid medium in a centrifuge, comprising:

a generally circular wall formed around an axis of rotation with an inner surface and an outer surface such that the outer surface is further from the axis of rotation than the inner surface;

the wall including at least one receptacle, the wall operable to receive a fluid medium having more dense material;

an opening formed in the wall, the opening extending from the at least one receptacle through the wall from the inner surface to the outer surface; and a valve ring having at least one orifice and formed over the opening, the valve ring operable to slide along the outer surface of the wall such that the at least one orifice aligns with the opening.

21. The fluid separation wall of claim 20, further comprising a pressure sensor operably coupled to the fluid separation wall, the pressure sensor operable to determine the pressure of with the fluid separation wall.

22. The fluid separation wall of claim 20, further comprising an actuator operable to cause the valve ring to slide between open and closed positions.

23. The fluid separation wall of claim 20, further comprising a controller operable to control the actuation of an actuator.

24. The fluid separation wall of claim 20, further comprising a slot and pin operable to guide the valve ring between a first and second position such that the at least one orifice aligns with the respective opening.

25. The fluid separation wall of claim 20, further comprising a plurality of vanes disposed on the valve ring, the vanes operable to interact with compressed air to cause the valve ring to move between open and closed positions.

26. The fluid separation wall of claim 20, further comprising a spring coupled between an outer section of the wall and the valve ring, the spring operable to bias the position of the valve ring.

27. The fluid separation wall of claim 20, further comprising a wear insert nozzle disposed in the opening, the wear insert nozzle operable to seat against the valve ring and guide the more dense material from the receptacle to the containment zone.

28. A fluid separation wall for separating more dense material from a fluid medium in a centrifuge, comprising:

a generally circular wall formed around an axis of rotation with an inner surface and an outer surface such that the outer surface is further from the axis of rotation than the inner surface;

the wall including at least one receptacle, the wall operable to receive a fluid medium having more dense material;

an opening formed in the wall, the opening extending from the at least one receptacle through the wall from the inner surface to the outer surface;

a valve ring having at least one orifice and formed over the opening, the valve ring operable to slide alone the outer surface of the wall such that the at least one orifice aligns with the opening;

an upper wedge coupled to the outer surface of the wall, the upper wedge operable to restrict the movement of the valve ring; and a lower wedge coupled to the outer surface of the wall, the lower wedge operable to restrict the movement of the valve ring.

* * * * *